United States Patent
Orus et al.

(10) Patent No.: US 6,851,607 B2
(45) Date of Patent: Feb. 8, 2005

(54) SECURED METHOD FOR MONITORING THE TRANSFER OF VALUE UNITS IN A CHIP CARD GAMBLING SYSTEM

(75) Inventors: Herve Orus, Camoux en Provence (FR); Jean-Jacques Foglino, Peynier (FR)

(73) Assignee: Gemplus, Gemenos (FR)

(*) Notice: Subject to any disclaimer, the term of this patent is extended or adjusted under 35 U.S.C. 154(b) by 84 days.

(21) Appl. No.: 10/396,605

(22) Filed: Mar. 21, 2003

(65) Prior Publication Data

US 2004/0035926 A1 Feb. 26, 2004

Related U.S. Application Data

(63) Continuation of application No. 09/202,424, filed as application No. PCT/FR98/00582 on Mar. 20, 1998, now abandoned.

(30) Foreign Application Priority Data

Apr. 11, 1997 (FR) .............................................. 97 04733

(51) Int. Cl.⁷ ................................................ G06K 5/00
(52) U.S. Cl. ....................................................... 235/380
(58) Field of Search .................................. 235/380, 381

(56) References Cited

U.S. PATENT DOCUMENTS 5,429,361 A * 7/1995 Raven et al. .................. 463/25
5,451,756 A * 9/1995 Holzer et al. ................ 235/381

* cited by examiner

Primary Examiner—Mark Tremblay
(74) Attorney, Agent, or Firm—Roland Plottel

(57) ABSTRACT

A secure system and method for the transfer of value units between a plurality of gambling cards (CJ) and a plurality of gambling machines (200, 300). Each machine has a transcriber (210, 310) to debit value units of the gambling cards. The machines are connected via a secure network (123) to a central processing unit (1). Each gambling card (CJ1) stores data (S, Op1, Op2, Opx, Id, S) unique to the card and the use of that card in gambling. The central processing unit (1, BD) stores the same data as what is in the cards. The cards' and the CPU's data are maintained in parallel as the gambling progresses, and may include data from previous sessions. A monitor (BD) checks that the CPU (1, BD) data and the card (CJ1) data correspond. Thus the integrity of this smart card gambling is enhanced.

15 Claims, 2 Drawing Sheets

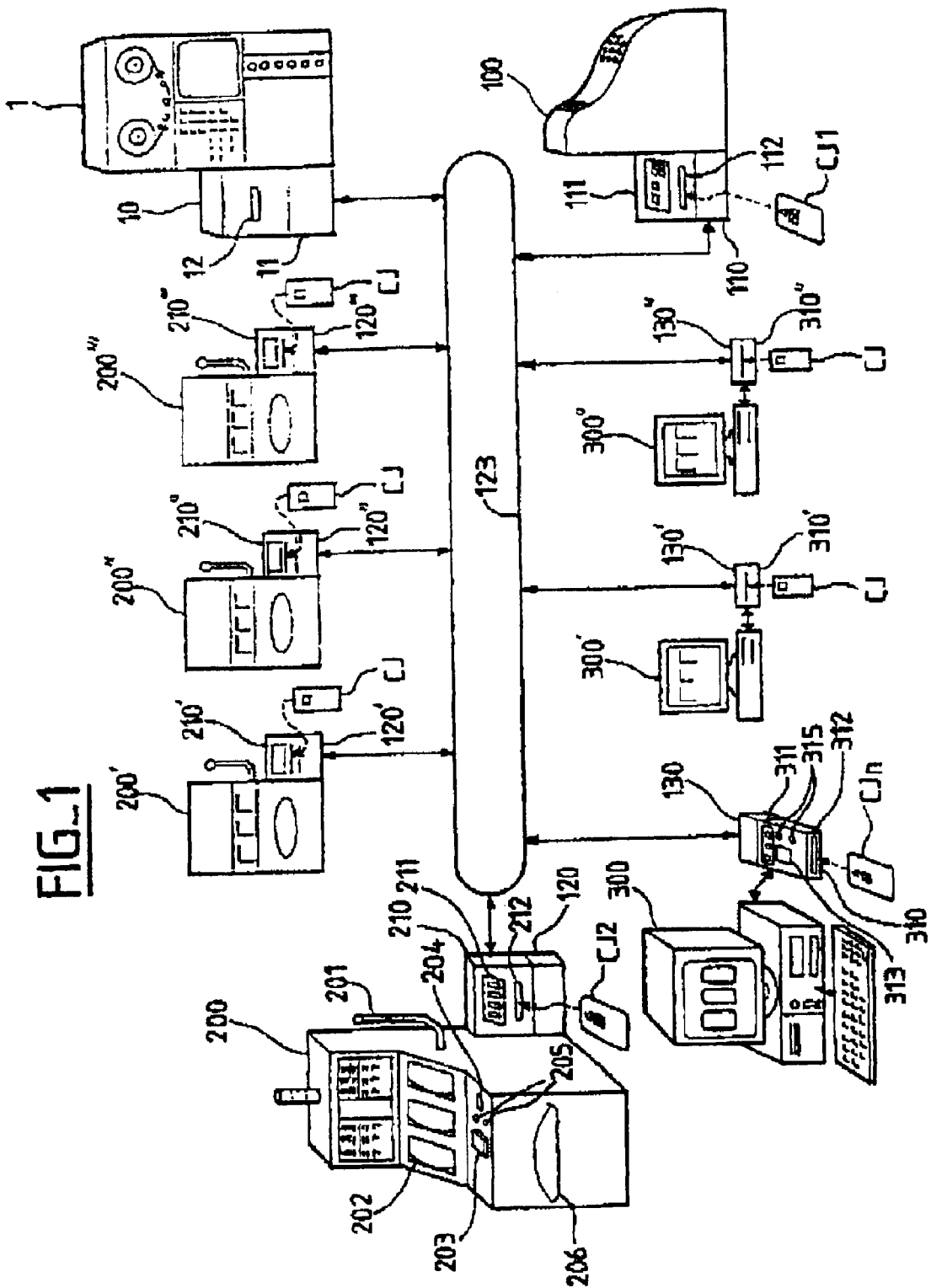
FIG_1

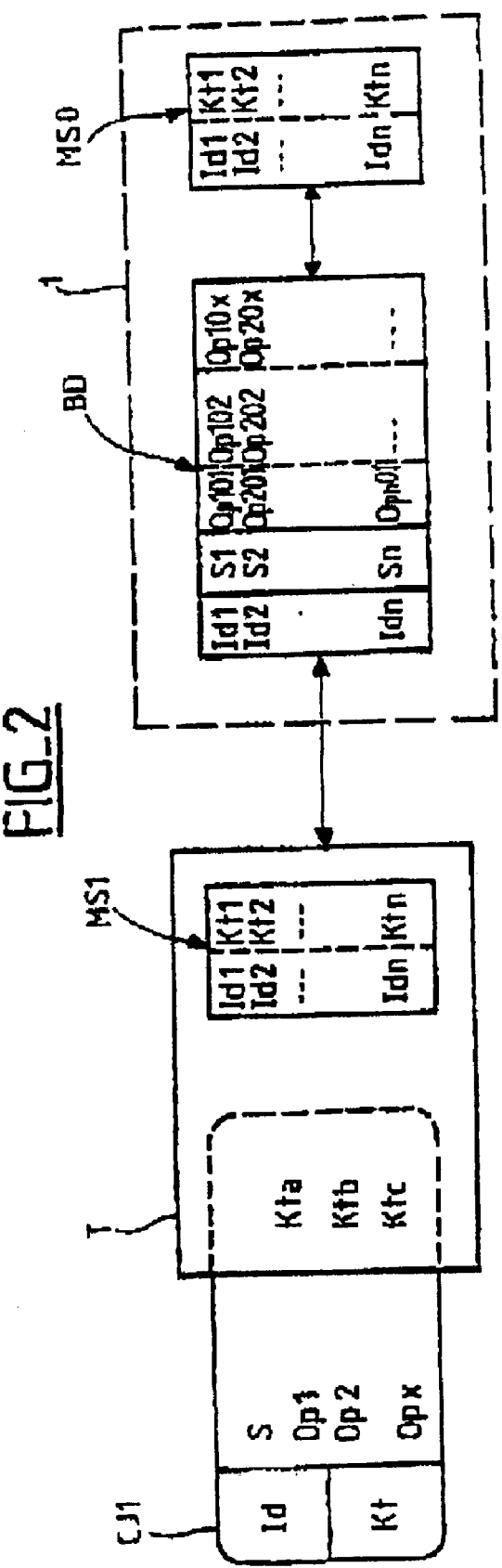
FIG_2
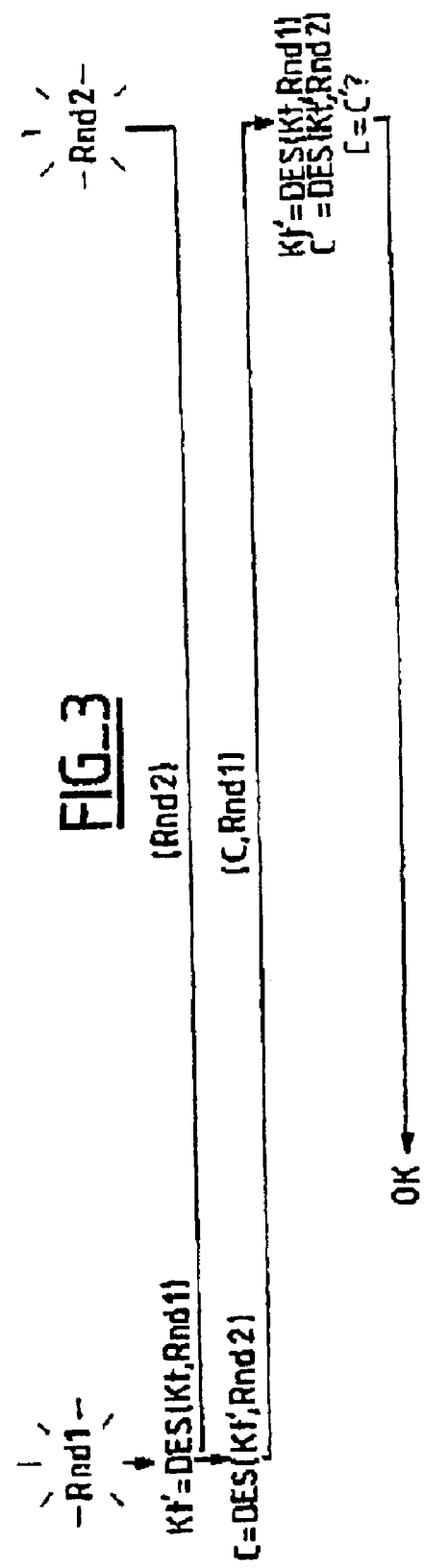
FIG_3

SECURED METHOD FOR MONITORING THE TRANSFER OF VALUE UNITS IN A CHIP CARD GAMBLING SYSTEM

This application is a continuation of Ser. No. 09/202,424 Feb. 19, 1999, now abandoned, which is a 371 of PCT/Fr98/00 582 Mar. 20, 1998.

The present invention relates to the field of slot machines such as jackpot machines and other individual gambling machines of the type found in casinos.

It relates in particular to slot machines in which bets and winnings are recorded with gambling cards. The gambling cards are of the chip card or contactless card type. The gambling cards can be dedicated to this use similarly to telephone cards. They are advantageously bank cards so that sums of money can be transferred directly to the slot machine.

The present application relates to a method and system for monitoring the transfer of value units between a plurality of gambling cards and a plurality of gambling machines, each machine being connected to a gambling card data transcriber able to credit and/or debit value units in the memory of a gambling card.

One general objective of monitoring the transfer of value units between gambling cards and gambling machines is to avoid fraud using such cards.

Management systems for gambling machines equipped with chip card readers designed for managing the gambling machines in relatively enclosed, controlled sites such as casinos are known. These systems are designed for such an environment since they are heavily regulated and controlled, and are unlikely to allow fraud in gambling transactions using chip cards.

Document EP-A-0 360 613 describes for example a system for transferring data between a chip card and a plurality of machines with means for transmitting and storing machine data in the chip card. Such a system makes it possible to list gambling operations with a collecting card that stores a list of gambling operations for accounting or tax purposes.

One drawback of such a system is that it is not possible to monitor all the gambling operations carried out unless all the gambling operations are polled with the collecting card, which is a time-consuming procedure.

Also, due to an increasing public demand, there are plans for setting up gambling machines in sites less protected than casinos such as private gambling rooms or bars, or even private homes such as those of the gamblers.

It is clear that such a dispersion of gambling machines poses substantial problems regarding the security of the transactions involved in gambling operations.

One goal of the invention is to enable gambling machines that operate with chip cards in unprotected sites to be developed.

Another goal of the invention is to reinforce the integrity of gambling machines operating with chip cards.

The invention provides for the gambling machines to be networked with a central processing unit. According to the invention, the central processing unit has a database storing information corresponding to that stored in gambling cards such as information on the gambler, card identification data, and data on the stored value balance in the card. When the card data are checked against the database of the central processing unit, the integrity of such a gambling machine system operating with chip cards or contactless cards can be ensured.

The invention thus provides a secured method for monitoring transfers of value units between a plurality of gambling cards and a plurality of gambling machines, each machine being connected to a transcriber of data onto a gambling card, the machines being connected in a secured network with a central processing unit by means of link means, the method having the following steps, during a gambling operation:

reading data stored in a gambling card, particularly an identification number of the card and/or data representing the value units debited and/or credited during the preceding gambling operations;

exchanging data between the machine and a database of the central processing unit by means linking the secured network, particularly data representing the balance of the value units and/or the identification number of the card; and checking that the data stored in the gambling card correspond to the data in the database in order to monitor the integrity of a system constituted by such a card, such a machine, the network, and the central processing unit.

The invention advantageously provides security means enabling the data messages exchanged over the network to be authenticated, namely enabling such messages to be signed.

The invention also provides a secured system for monitoring transfers of value units between a plurality of gambling cards and a plurality of gambling machines, each machine being provided with a transcriber able to debit value units of a gambling card, the machines being connected in a secured network with a central processing unit by link means, whereby a gambling card stores data representing gambling operations conducted, particularly data identifying the card and data representing the balance of the value units debited and/or credited during previous gambling operations, characterized in that the central processing unit has a database that in parallel stores the data representing gambling operations carried out, particularly card identification data and data representing the balances of the value units debited and/or credited during previous gambling operations, and in that the monitoring means check that, for an identified card, the database data and the card data correspond, particularly that the data representing the value unit balance correspond, in order to verify the integrity of the system.

A security module for authenticating data messages can advantageously be provided in the network, in a transcriber, a machine, the central unit, or even network link means.

The invention will be better understood by reading the description and the drawings that follow, provided solely as nonlimiting examples; in the attached drawings:

FIG. 1 shows a secured system for monitoring the transfer of value units between a plurality of gambling cards and a plurality of gambling machines able to implement the invention;

FIG. 2 is a flowchart of data exchange and data verification according to the invention; and FIG. 3 represents calculation of the authentication certificate by security means according to the invention.

FIG. 1 shows a secured system of gambling machines as proposed by the invention, having one or more gambling machines 200, 200', 200", and 200"', Such a gambling machine 200, similar to the slot machines found in casinos, has an electronic coin meter 210 that will hereinafter be called data transcriber, which transcribes data onto gambling card CJ.

The card data transcriber 210 is connected to the electronics of machine 200, for example by a serial connector of the RS 485 type. The machine and reader have input-output interfaces designed for this link.

Classically, the machine is equipped with a display 211 informing the gamblers at all times of the balance they have available for playing and the bets placed and winnings made.

Machine 200 in the figures can of course be an electronic coin meter machine exclusively, but also a double coin meter machine, namely a machine that not only has this electronic coin meter but also a coin (or token) meter symbolized by reference 201.

In the case of a double coin meter machine, the gambler is able to play with coins or tokens and receive his winnings solely in the form of coins.

The gambling cards CJ shown in the form of chip cards have an electrically erasable read-only memory, for example an EEPROM memory.

It may be for example a chip card with a microprocessor, a program memory, and a RAM type working memory.

These chip cards can also be unit-loading cards of the rechargeable type. These cards have for this purpose an electrically programmable memory of the abacus type.

In addition, the gambling cards can be contactless cards, where the card has an integrated circuit memory and a microprocessor and an electronic circuit for transmitting data without electrical contact. For example a transponder such as that described in French Patent Application FR 96 16061 can be used.

The construction of gambling machines 200 and their connection to data transcribers transcribing onto gambling cards will not be described in detail here. Construction examples of gambling machines are described for example in French Patent FR 96 10031 the description whereof is incorporated herein by reference.

For monitoring the gambling operations and transactions with the cards, machines 200, 200', 200", and 200''' are networked together with a central processing unit designated 1 in FIG. 1. The machines in the network are connected to central processing unit 1 by link means 123. As shown in FIG. 1, machines 200, 200', 200", and 200''' can also be connected with each other by the network.

Link means 123 in the case of a local area network like that of a casino are constituted by a local link. The local link is for example a serial link of the RS 485 type, a parallel bus connector, an optical fiber, a radio link, or any other transmission means.

In the case of a network linking dispersed gambling rooms, the link means may be transmission channels specific to the network, or telephone lines.

To establish telephone links, the network has modulator-demodulators of the modem type 120, 120', 120", and 120''' interfaced with link means 123 and a gambling machine 200, 200', 200", and 200''', respectively.

Central processing unit 1 is for example a central computer also connected to link means 123 by a modem 101 in order to form part of the network.

FIG. 1 shows link means 123 in the schematic form of an annular line to which gambling machines 200, 200', 200", and 200''' are connected. The machines are hence connected with each other and with central processing unit 1. The link may however assume any equivalent form.

In the case of telephone links, the machines are connected individually with the central processing means, and the machines are not necessarily linked together. Modem 101 of processing means 1 may advantageously have a switchboard with several telephone lines.

The use of telephone links has the advantage of extending the network to the homes of the gamblers. The gambling machines are preferably personal computers 300 and 300' of the PC type. The machines can thus each be connected to a transcriber that transcribes data onto a gambling card 310 or 310' preferably having a modem 130 or 130' for example of the Gemtel type sold by the applicant.

The network used may in particular be an open communication network of the Internet type.

The system and network also have at least one loading terminal shown in FIG. 1 in the form of a cash register 100. Loading terminal 100 in this case has a transcriber 110. Terminal 110 and transcriber 110 are connected to the network through a modem 111 connected to link means 123.

Classically, the chip cards dedicated to gambling are non-reloadable cards like telephone cards, and are produced and loaded only by a central organization.

In one application with non-reloadable cards, database BD of central processing means 1 has initial balances S1, S2, ..., Sn of values credited in cards CJ1, CJ2, ..., CJn before they are placed in circulation.

However, according to one advantageous variant, the cards are reloaded with value units by loading terminals.

In practice, such a terminal may be the terminal of a casino cashier. Alternatively, a multitude of loading terminals may be disposed at news-agents or other businesses accessible to the gamblers.

Thus, when a gambler wishes to obtain credit, he hands his gambling card CJ1 to the operator entitled to use terminal 100, who inserts this card into the transcriber part 110 of this terminal 100 and, using the cash register keyboard, enters the credit amount the gambler desires. This amount is transferred to transcriber 110 which then records on chip card CJ1 the significant information corresponding to the credit desired by the gambler.

According to the invention, the reloading terminal can then communicate to central processing unit 1, by means of network link means 123, the data read into the card to be reloaded, particularly its identification number Id and its balance S of value units. The identification number Id of gambling card CJ1 can be checked directly by reloading terminal 100 or by its data transcriber 110 or alternatively by central processing unit 1. The invention thus calls for a step preceding the gambling operations which is to enter, in the database of central processing unit 1 and in the memory of a gambling card CJ1, data representing an initial balance value when the operation preceding the loading of card CJ1 is carried out.

According to the first alternative, as shown in FIG. 2, the reloading terminal or its transcriber T has secret identification keys Kt1, Kt2, ..., Ktn of all the gambling cards CJ1, CJ2, ..., CJn in circulation. These secret keys are preferably stored in a security module MS1 which has a memory and calculating unit; the stored data are not accessible from the outside. Terminal 100 then checks that the identification Id1 of chip card CJ1 is correct using the corresponding key Kt1, applying an authentication or encryption algorithm according to known methods.

According to the second alternative, this card authentication is carried out by the central processing unit 1, the identification numbers Id1, Id2, ..., Idn and corresponding authentication keys Kt1, Kt2, ..., Ktn being stored in database BD of the central processing unit or preferably in a security module MS0 similar to MS1. This second alternative has the advantage of preventing the secret authentication keys from being disseminated.

The invention also provides for an exchange of data between the terminal and the central processing unit of data stored in the database of central processing unit 1. Preferably, this data exchange is accompanied by an authentication certificate. A security protocol for transmitting such certificates will be described below. This protocol advantageously prevents a spurious machine in the network from falsely crediting the database. Terminal T can thus communicate balance S of the values previously debited or credited on gambling card CJ1 to the central processing unit 1. After authenticating identification number Id1 of the card or the certificate accompanying the balance data, one can thus check that the balance S entered in the memory of gambling card CJ1 indeed corresponds to the balance S1 stored in database BD. If the check is positive, the central processing unit 1 sends an approval signal so that card CJ1 can be reloaded by the terminal and transcriber T. If the check is negative, an alert procedure or signal can be put into effect at central processing unit 1 or at the loading terminal. In a network of casino slot machines for example, the cashier can be alerted by the loading terminal to find out the reason for such a malfunction. In a more extensive network, card CJ1 can be swallowed by transcriber T of the terminal so that the malfunction can be investigated.

In addition, the database or memory of gambling cards CJ may also contain information on the gambler, for example his age, gambling habits for gambler loyalty applications, awarding free games, etc.

We will now present protocols for monitoring value unit transfers during gambling operations carried out with the method or system according to the invention.

At the start of the gambling operations, the transcriber that transcribes data onto card 210 of the gambling machine reads the identification number in the memory of gambling card CJ1. As stated previously in regard to FIG. 2, this identification number Id is preferably authenticated by a security module MS1 provided in transcriber T. The Id number may be communicated to central processing unit 1 in order to authenticate card CJ1 with identification key Kt1 contained in security module MS0. This identification stage is preferably carried out once for several gambling operations with the same card on the same machine, with the machine or terminal possibly memorizing this identification number Id for the following operations.

With each following gambling operation, the balance S of the value units allocated to the gambler is reviewed following bets placed or winnings made.

According to a first embodiment of the invention, data on the gambling operation carried out are simply communicated to central processing unit 1, particularly the new value unit balance obtained during this gambling operation. Central processing unit 1 can thus store the list of operations carried out in the form of a list of successive credits or debits recorded on card CJ1. This list of operations Op101, Op102, ..., Op10x is for example recorded in database BD under identification number Id1 of card CJ1 during use.

Entry of balance S1 or operations Op101, Op102, ..., Op10x in database BD of central processing unit 1 then serves to establish an accounting statement of the operations or a tax verification. Such a history of operations also enables the extent of the fraud to be measured if a forged card is checked.

According to a second embodiment of the invention, there is an additional step of checking that the data stored in card CJ1 and the data in database BD correspond so that the integrity of a system of which such a card CJ1, such a machine 200, network 123, and central processing unit 1 are composed can be checked.

Two types of check can be used: a check of identification number Id or a check of the card balance S.

The check of the identification number Id1 of card CJ1 is run with an identification key Kt1 as seen above. According to this second embodiment, identification number Id is communicated to central unit 1 via the link means of the network. Central unit 1 stores identification keys Kt1, Kt2, ..., Ktn of cards CJ1, CJ2, ..., CJn in circulation, in its database BD or preferably in a security module MS0. Security module MS0 thus performs the identification calculations internally.

Also, the check can be made on the value unit balance in card CJ1. In this case, transcriber T reads from the card the data on the value unit balance S and sends the data to central processing unit 1 through network link means 123. Balance S of card CJ1 is then read by comparison to balance S1 indicated in database BD under identification number Id1. If the two balances S and S1 match, the gambling operation is authorized by central processing unit 1.

According to another alterative, the check can be made of the certification of the data exchanged from gambling card CJ1. Standard data encryption algorithms of the DES algorithm type can certify the digital data exchanged between card CJ1, transcriber T, the gambling machine, and central processing unit 1. Encryption and decryption of the certificate accompanying the transmitted data is possible and consistent only if a secret key is used.

The data encryption algorithms of the DES type have complex series of calculations that will not be presented in detail herein.

One example of using DES algorithms will be presented simply considering that the algorithm furnishes an encrypted number called session key K', from a first given number, called identification key K, and a random number Rnd, according to the example in the formula below:

$$K'=DES(K, Rnd)$$

The complexity of the DES algorithms makes it impossible to discover a secret identification key K from session key K' and random number Rnd.

FIG. 3 shows one example of application of an algorithm DES. It illustrates the means by which the network is secured, particularly the securing of data exchanges effected via the network link means. The gambling card has at least one secret identification key Kt in an inaccessible memory zone. The card microprocessor generates a pseudo-random number Rnd1. From these two numbers Rnd1 and Kt, the DES algorithm used by the microprocessor calculates a session key Kt'.

This session key Kt' can serve as an authentication certificate and be sent with random number Rnd1 and the data to be certified. However, to make it impossible to discover the keys, the DES algorithm is applied a second time. As can be seen in FIG. 3, the gambling card, the element sending the message to be certified, asks the target element, central unit 1 for example, to supply it with a second random number Rnd2.

The DES algorithm is once more applied to session key Kt' and second random number Rnd2 by the card microprocessor to calculate a certificate C.

The data message is then sent to the target element accompanied by certificate C and random number Rnd1 both calculated by the card. Thus, the keys used, in particular secret identification key Kt, are not exchanged.

Authentication of the data message is effected by recalculating a certificate C' from the same data. Central processing unit 1 has secret identification key Kt in its secured module MS0. Secured module MS0 can thus calculate session key Kt' from identification key Kt and random number Rnd1.

Secured module MS0 still has the random number Rnd2 it previously supplied to the gambling card. From these two numbers, Rnd2 and Kt', security module MS0 once again calculates a certificate C', applying the DES algorithm a second time.

By checking that certificate C calculated by the card matches certificate C' recalculated by its security module, the central unit can authenticate the data message received.

Note that session key Kt' and certificate C are recalculated with each desired message certification. This prevents a pirate machine in the network from gaining access to the database or card memory by copying a previous certificate.

After making one or more of these checks, central unit 1 sends an approval signal which can be encrypted or encoded. With such an approval signal, the gambler can use his gambling card CJ1, make bets, effect gambling operations, and reload his card with his winnings.

In these first two embodiments, it has been shown that the card has an identification function, whereby its Id number enables central unit 1 or the gambling machine to recognize it and even recognize the gambler in certain client loyalty applications. Moreover, the card has a purse function, as the value unit balance is stored in the card and essentially known by the card, and the balance can be copied into central unit 1 for checking purposes.

According to a third embodiment, the purse function is no longer provided by the card but by the central processing unit itself. In this case the card has no data on the gambler's balance but only identification data such as identification number Id, several authentication keys Kta, Ktb, and Ktc, and possibly information on the gambler. The value unit balance data S1 are then stored only in database Bd of central processing unit 1. This value unit account is located for example in the database under identification number Id1.

In a gambling operation, identification number Id of card CJ1 is sent to central processing unit 1 through link means 123 of the network. The identification number Id can be sent directly by gambling machine 200 or its transcriber 210 if it has been memorized by the machine or its transcriber. Identification number Id can also be read from the card and sent to central processing unit 1 by transcriber 210 with each gambling operation.

After identification number Id has been checked, central processing unit 1 consults database Bd and sends the balance S1 of the value units allocated to card CJ1, to gambling machine 200.

Preferably, the data on the value unit balance are transferred with a certificate according to the data exchange securing protocol presented above.

One advantage of this third embodiment is that the sums bet are stored in central processing unit 1, which prevents any value from being memorized by the gambling cards.

According to this third embodiment, data representing the balance of the debited and/or credited values are stored in the database of the central processing means to prevent fraud from a chip card.

The check, in this third embodiment, is simply a check of the identification number Id of gambling card CJ1 with an identification key Kt1 read in database BD of central processing unit 1 to check the integrity of the card.

With these three embodiments of the invention, the integrity of gambling cards used in gambling machines can advantageously be monitored.

Moreover, by using data exchange securing means, the invention advantageously enables the integrity of a system formed by the gambling cards, the gambling machine network, and the database of the central processing unit to be checked, with the integrity of one of the three system elements, namely a gambling card or the network or the database, being checked with the aid of the other two elements.

The invention thus provides a system able to implement the method according to the invention.

A system of this type has a plurality of gambling machines, each machine being provided with a transcriber able to debit value units of a gambling card, the machines being networked with a central processing unit by link means.

According to the invention, the data representing gambling operations carried out with a chip card in a gambling machine are stored in the gambling card memory and, in parallel, in a database provided in the central processing unit.

The stored data are in particular card identification data and data on the balance or successive balances of value units debited and/or credited with the card.

Monitoring means such as a computer program authenticating the card identification number or comparing balance values stored in the card with those in the database or certifying the data exchanged are provided to check the integrity of the system.

Preferably, to secure the data exchanged over the network, a security module calculates an authentication certificate from secret data stored in the memory of the module and the monitoring means check that the authentication certificate calculated by the security module corresponds to the authentication certificate calculated by the gambling card or by another security module.

Such security modules MS0, MS1 can be disposed in gambling cards CJ1, CJ2, . . . , CJn, or in transcribers 10, 110, 210, 210', 210'', 210''', 310, gambling machines 200, 200', 200'', and 200''', of central processing unit 1, or even in the link means 123 of the network.

In particular, several security modules or means distributed in the network can be provided. Each transcriber 10, 210, 210', 210'', 210''' or each interface 11, 120, 120', 120'', 120''' has for example a security module so that data exchanges over link means 123 are accompanied by the authentication certificate. For example transmitting transcriber 10 adds to its message its certificate which is authenticated by the target transcriber 210 before being transmitted to the corresponding machine 200.

Other embodiments, advantages, and characteristics of the invention will appear to the individual skilled in the art, without departing from the framework of the claims below.

What is claimed is:

1. A method for monitoring transfers of value units between a plurality of gambling cards (CJ, CJ1, CJ2, CJn) and a plurality of gambling machines (200, 200', 200'', 200''', 300, 300', 300''), each machine being connected to a transcriber (210) of data onto a gambling card (CJ2), the machines being connected in a secured network with a central processing unit (1) by link means (123), the method having the following steps, during a gambling operation:

reading data stored in a gambling card, particularly an identification number (Id) of the card (CJ1) and data (S, Op1, Op2, Opx) representing the value units debited and credited initially and during the preceding gambling operations, the method being characterized by the following steps:

electronically securing and exchanging data between the machine (200) and a database (BD) of the central processing unit (1) by means (123) linking the secured network, particularly data representing the balance (S) of the value units and the identification number (Id) of the card; and updating data in parallel in both the card and the database of the central processing unit at least twice during each use of the card in a gambling playing session and then checking that the data stored in the gambling card (CJ1) correspond to the data in the database (BD) in order to monitor the integrity of a system constituted by such a card, such a machine, the network, and the central processing unit.

2. Method according to any one of the foregoing claims characterized in that the network also has security means (MS0), the method having the following additional step:

having the security means (MS0) of the network calculate an authentication certificate (C1) from the secret data (Kt, Kt') stored in the chip card memory.

3. Method according to claim 2 characterized by the following additional step:

reading an authentication certificate (C) calculated by gambling card (CJ1) from the secret data (Kt, Kt1) in the card memory.

4. Method according to claim 3 characterized by the checking step of:

checking that the authentication certificate (C) calculated by gambling card (CJ1) corresponds to the authentication certificate (C') calculated by the security means (MS0) of the network.

5. Method according to any one of the foregoing claims characterized in that the network also has distributed security means (MS0, MS1), the method having the following additional steps:

having the first security means (MS0) of the network calculate a first authentication certificate (C') from the secret data (Kt, Kt') in the memory of the first security means (MS0), and having the second security means (MS1) of the network calculate a second authentication certificate from the secret data (Kt, Kt') in the memory of the second security means (MS0), and checking that the first authentication certificate (C') calculated by the first security means (MS0) of the network corresponds to the second authentication certificate calculated by the first security means (MS0) of the network corresponds to the second authentication certificate calculated by the second security means (MS1) of the network.

6. Method according to any one of claims 2 to 5 characterized in that the data (Id, S) exchanged between machine (200) and database (BD) of central processing unit (1) are accompanied by an authentication certificate (C, C').

7. Secured system for monitoring transfers of value units between a plurality of gambling cards (CJ) and a plurality of gambling machines (200, 300), each machine being provided with a transcriber (210, 310) able to debit value units of a gambling card (CJ), the machines being connected in a secured network with a central processing unit (1) by link means (123), whereby a gambling card (CJ1) stores data (S, Op1, Op2, Opx) representing gambling operations conducted, particularly data identifying the card (Id) and data representing the balance (S) of the value units debited and/or credited during previous gambling operations, characterized in that the central processing unit (1) has a database (BD) that in parallel stores the data (S1, Op101, Op102, Op10x) representing gambling operations carried out, particularly card identification data (Id1, Id2, Idn) and data representing the balances (S1, S2, Sn) of the value units debited and/or credited during previous gambling operations and in that the monitoring means (BD) check that, for an identified card, the database (BD) data and the card (CJ1) data correspond, particularly that the data (S, S1) representing the value unit balance correspond, in order to verify the integrity of the system.

8. Secured system according to claim 7, characterized in that the gambling card (CJ1) calculates an authentication certificate (C) from the secret data (Kt, Kt') stored in the memory of card (CJ1).

9. Secured system according to claim 7 or claim 8, characterized in that in that it additionally comprises a security module (MS0, MS1), whereby the security module calculates an authentication certificate (C') from the secret data (Kt, Kt') stored in the memory of the module (MS0) and in that the monitoring means (MS0) check that the authentication certificate (C') calculated by the security module corresponds to the authentication certificate (C') calculated by the gambling card or by another security module (MS1).

10. The method of claim 1, wherein the data in the card and in the database are updated for every change of value of the card, whereby each win and loss of a player is stored in parallel in both the card and the database.

11. A method for monitoring transfers of value units between a plurality of gambling cards and a plurality of gambling machines, each machine being connected to a transcriber of data onto a gambling card, the machines being connected in a secured network with a central processing unit comprising the steps of, during a gambling operation:

(a)—reading data stored in a gambling card, particularly an identification number of the card and data representing the value units debited and credited during the preceding gambling operations, (b)—electronically securing and exchanging data between the machine and a database of the central processing unit by the secure network, particularly data representing the balance of the value units and the identification number of the card, (c)—checking that the data stored in the gambling card corresponds to the data in the database in order to monitor the integrity of a system constituted by such a card, such a machine, the network, and the central processing unit; and (d)—wherein said exchange and checking steps are performed for each change of value of the card.

12. The method according to claim 11, comprising storing secret data in each card, and also storing secret data for each card in said database, calculating an authentication certificate (C1) from the secret data, paid authentication artifacts accompanying said data exchanges and said checking step comprises checking that the authentication certificates caluclated by the card corresponds to the authentication certificate calculated from the database.

13. A system for players to gamble over the internet from computers which are connected to the internet and which are not owned by the system operator, and which computers are connected to transcribers for smart cards comprising:

smart cards each with a security module, memory and processor, said card being pre-loaded with gambling value units, and security module features, a main computer with a security module, memory and a connection to connect to the internet, said memory storing in parallel with said cards the value units entered into each card, and the security features to identify each card, said cards including means for storing in the cards each change of value units while a player gambles on the computer, and said security module having means for electronically securely arranging with an authentication card said change of value units, and then transmitting same to the internet connection and thus to the computer, said computer module authenticating each of said transmitted change of value units, and then storing said change of value of the cards in parallel with the same data in the cards, and including means for verifying said change of value units of said cards before enabling a next play that would involve a further change of value by the gambler.

14. A method for players to gamble over the internet from computers which are connectable to the internet and which are not owned by the system operator, and which computers are connected to transcribers for smart cards comprising the shape of:

issuing to players smart cards with a security module, memory and processor, and being pre-loaded with gambling value units, and security module features, establishing a main computer with a security module, memory and a connection to connect to the internet, storing in said memory the value units entered into each card and the security features to identify each card, storing in the cards each change of value units while a player gambles on the computer, and authentication in said security module for each of said change of value units and then transmitting each of said authenticated change of value units to the internet connection and thus to the computer, receiving said transmission, authenticating the validity thereof, and if validated, then storing said change of value in said computer, in parallel with the same data in the cards, and enabling a next play by the gambler only after said parallel stored data is entered and verified.

15. The method of claim 1 or 11, wherein said data representing gambling operations are stored sequentially in parallel in the gambling card memory and in the database with successive balances of value units debited/credited with the card.

* * * * *